May 25, 1954 W. P. LEAR 2,679,394

MAGAZINE AND DRIVE FOR MAGNETIC TAPE REPRODUCERS

Filed Aug. 30, 1951 2 Sheets-Sheet 1

INVENTOR.
William P. Lear
BY
Leonard S. Kleinfeld
Attorney

May 25, 1954 W. P. LEAR 2,679,394

MAGAZINE AND DRIVE FOR MAGNETIC TAPE REPRODUCERS

Filed Aug. 30, 1951

2 Sheets-Sheet 2

INVENTOR.

William P. Lear

BY

Attorney

Patented May 25, 1954

2,679,394

UNITED STATES PATENT OFFICE 2,679,394

MAGAZINE AND DRIVE FOR MAGNETIC TAPE REPRODUCERS

William Powell Lear, Santa Monica, Calif., assignor to Lear, Incorporated, Grand Rapids, Mich.

Application August 30, 1951, Serial No. 244,404

1 Claim. (Cl. 271—2.15)

This invention relates to sound reproducing apparatus utilizing an elongated medium upon which intelligence is impressed electromagnetically. Specifically it has reference to a magazine for storing an endless length of such medium, and to the means for traversing the medium past the transducing head.

Apparatus of the general class aforesaid is well known and usually employs a paper tape having a magnetizable material incorporated therewith. Briefly, an endless tape, upon which a message or program has been recorded, is carried in a magazine looped upon itself in a random serpentine distribution in order to keep the dimensions of the apparatus to a minimum. Driving means, including an idler roller or rollers and a power-driven roller, between which the tape is pinched, cause linear movement of the tape past a reproducing head which, in conjunction with an electronic amplifier and loudspeaker, result in play-back of the intelligence recorded on the tape.

Such devices have been found useful for advertising purposes. For example the device may be installed in a food market and the circuitry so arranged that upon interruption by a customer of a light beam impinging on a photoelectric cell, operation of the device will be initiated, and a short message promoting the advertiser's product thereby delivered. Thus customers are aurally stimulated into purchasing that product.

Since it is advisable to make frequent changes in the message in order that customers may not become annoyed by too frequent and therefore monotonous repetitions of the same message, or because the dealer often finds it advantageous to distribute this form of advertising among several of his products, an apparatus of the magazine type is much preferred in that changes in the subject matter may be quickly and easily made.

However prior devices of this character known to me have suffered the disadvantage of being clumsy and time-consuming when an exchange of magazines is to be effected. In those cases the tape has been so arranged that it becomes necessary to withdraw a loop of the tape through an aperture in the magazine or to grasp an already-protruding loop, and to thread the same between the driving rollers. Not only is this operation slow, but the flimsy tape is likely to be torn. Furthermore, having in view the random serpentine traverse of the tape within the magazine, these prior devices have failed to include means for reliably guiding the tape within the magazine. Consequently the tape frequently was torn while being moved.

Being cognizant of the foregoing shortcomings a principal object of my invention is to provide a magazine for use with apparatus of the class described which may be placed in position relative to the driving mechanism or withdrawn therefrom instantaneously, and without the need of a threading operation.

Another object is to provide a magazine as aforesaid which includes means for safely and reliably guiding the tape relative to the magazine.

Other objects will become apparent from the following description taken with the accompanying drawings, in which latter:

In broad aspect the invention contemplates the provision of a chassis within which an electric motor and a portion of the tape-driving mechanism are mounted, the tape-engaging wheel whereof is carried on a resilient support for properly gripping the tape between that wheel and an idler wheel within the magazine. The idler wheel is positioned at one corner of the magazine, which is of parallelepipedic configuration, thereby to afford the greatest possible area of the magazine into which the tape is delivered from the pinch-drive system, and thereby to facilitate the serpentine lay thereof. The chassis also carries clips for detachably holding the magazine in operative position.

Regarded in another aspect the magazine includes means for guiding a portion of the tape therein past the recording head, as well as means for causing the tape to bear upon the pole pieces of the head.

Figure 1:
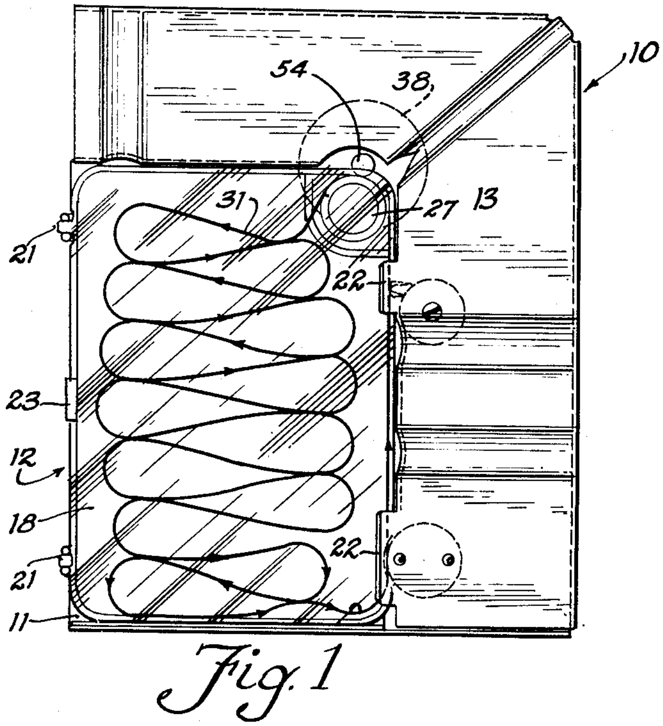
Fig. 1 shows a top plan view of the apparatus with the invention magazine in place thereon.
Figure 2:
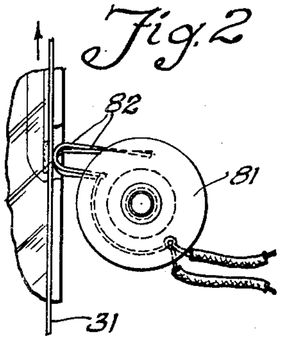
Fig. 2 is a detail in top plan of a switch for terminating traverse of the tape following a cycle thereof, and in its relation to the tape.

Referring to the drawings, and particularly Fig. 1, the chassis 10 comprises a sheet metal case or housing within which the electronic components, such as the amplifier and motor relay, may be contained, and which latter, not forming any real part of the invention, are not shown. The top wall of the case or housing 10 is depressed to form a shelf 11 upon which the magazine 12 is adapted to rest in substantially flush relation with the principal portion 13 of the chasis, and to enable alignment of the tape with the driving mechanism.

The magazine 12 (Figs. 1, 5 and 6) preferably comprises a structure of transparent plastic composition of parallelopipedic configuration and includes a bottom part 17 and a top part or cover 18, hinged together at 21—21. A suitable catch (not shown) enables the cover 18 to be held with respect to the bottom 17. Projections 22—22 extending from the chassis 13 are arranged to retain the magazine in a vertical sense, and a resilient finger 23 engages over the left side of the magazine for retention thereof in a lateral direction. The interior height of the magazine is selected so as to permit free movement of the tape therein. Preferably the magazine is of rectangular contour but may be of other form as long as the serpentine lay of the tape and the movement thereof are not hampered.

Figures 5, 6:
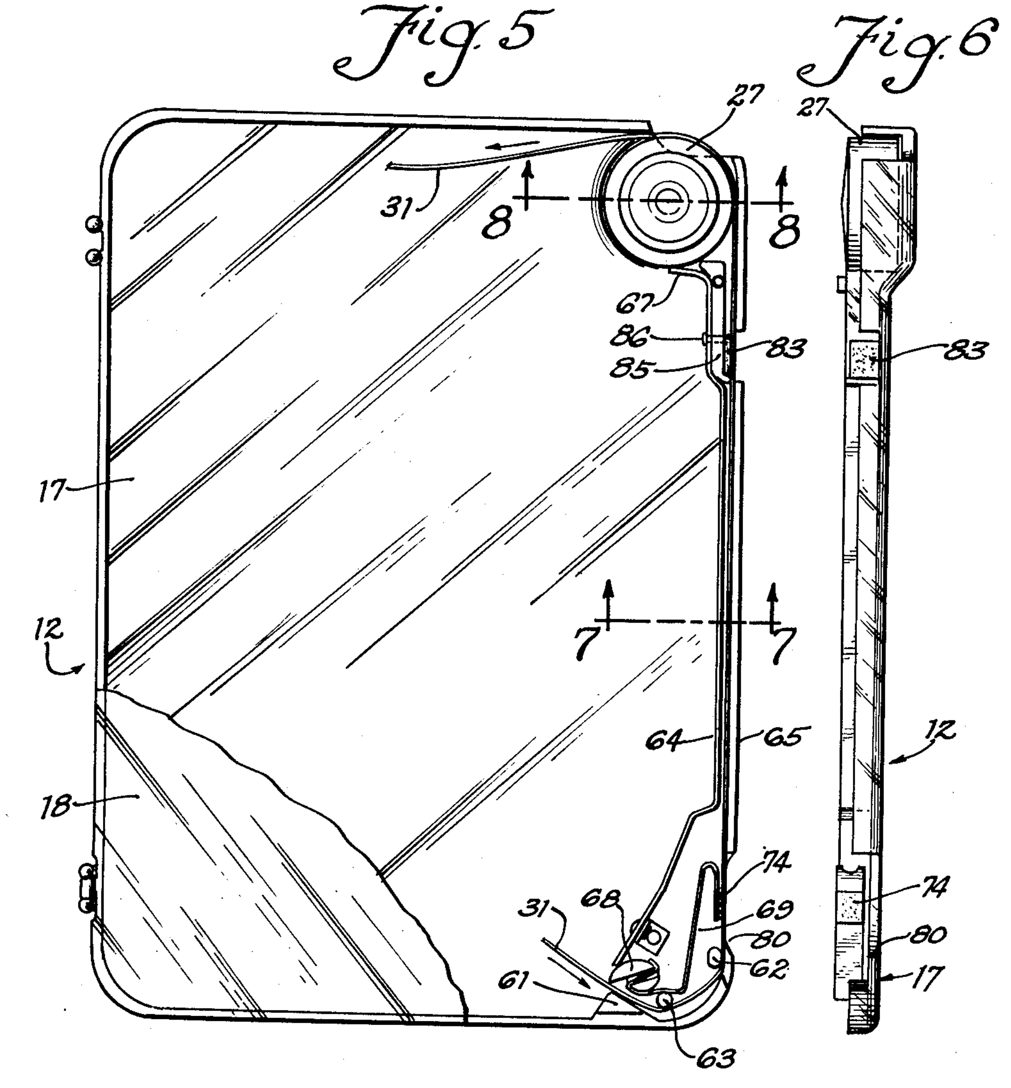
Fig. 5 is a top plan view of the magazine, but with the larger part of its cover broken away.
Fig. 6 is a right side elevational view of the showing of Fig. 5.
Figure 7:
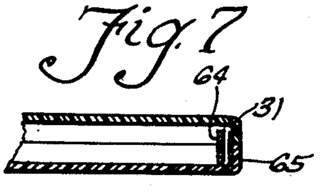
Fig. 7 is a cross section taken on the line 7—7 of Fig. 5, with the magazine cover in place.
Figure 8:
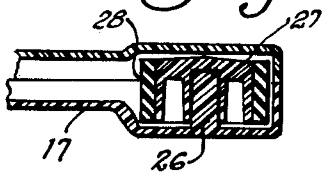
Fig. 8 is a cross section taken on the line 8—8 of Fig. 5, with the magazine cover in place.

Referring now to Figs. 5 and 8 the bottom 17 of the magazine is provided with a spindle 26 upon which an idler wheel 27 is supported for free rotation. To minimize slippage of the tape a rubber tire 28 my be incorporated thereon. The tape 31 is arranged to pass over the periphery of the wheel 27 in the direction of the arrow in Fig. 1, and thence to take up a random serpentine distribution within the magazine. For ease of drafting such distribution is indicated in Fig. 1 as followng a more or less zig-zag pattern, although it will be understood that the bights will, in practice, be of various sizes and variously related.

Figure 4:
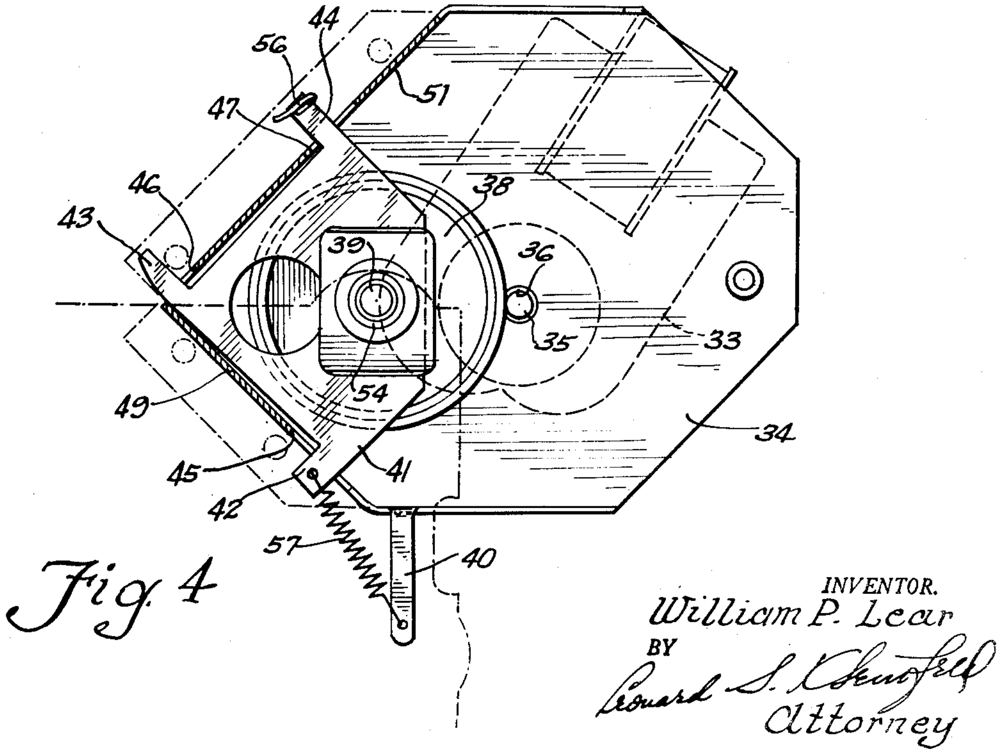
Fig. 4 is an enlarged partial view of that portion of the driving mechanism which is carried on the chassis.

Any suitable motive force may be employed to drive the tape. By way of example I show (Fig. 4) an electric motor 33 mounted below a frame 34 secured to the chassis 10 below the principal portion 13 thereof, the shaft 35 of the motor protruding upwardly through an aperture 36. A rubber-tired intermediate wheel 38 is rotatably supported at 39 on a bracket 41. Projections 42, 43 and 44 extending from the bracket are received in slots 45, 46 and 47 respectively in the upturned margins 49 and 51 of the frame 34. Slots 45, 46 and 47 are of a width just sufficient to receive slidably the projections therein in a depthwise sense, but are of such length that the several projections may move freely laterally. Thus the bracket 41 and its thereon-mounted wheel 38 is capable of lateral movement in any direction. Displacement of the bracket from its free mounting is prevented by a cotter pin 56, by the engagement of the wheel 38 with the shaft 35, and by the relative dimensions and positioning of the several slots and projections. A tension spring 57 is connected between the projection 42 and an arm 40 of the frame 34, and normally urges the wheel 38 into driven relation with the shaft 35. A rubber-tired wheel 54 is also carried on the shaft 39 for joint rotation with the wheel 38 and is adapted, upon positioning of the magazine in the chassis, and by reason of the bias of the spring 57, to contact the tape 31 in the region of its contact with the idler wheel 27. Hence by virtue of the spring 57 the tape is appropriately pinched or gripped between the wheels 27 and 54 whereby, upon rotation of the shaft 35, movement is imparted to the tape. It will be obvious that the relative diameters of the shaft 35 and wheels 38 and 54 are such as to reduce the speed of the motor to that required for proper linear speed of the tape.

From that portion of the description just completed, it will have become apparent that the magazine may be engaged and disengaged with respect to the chassis and the driving wheel 54 without concern for the position of the tape since the same is at all times around the periphery of the wheel 27, and in position for contact with the wheel 54.

Electromagnetic recording tape 31 is in general quite thin, and possesses very little rigidity. Hence it is generally loaded into the magazine at the recording studio where skilled hands are available to perform this specialized task. At the time of such preliminary loading the serpentine arrangement necessitated by storage of a substantial length of tape in a relatively small space is effected in a random manner entirely at the will of the operator, with proper care being given to the feeding of the tape in the guideways to be described immediately. During operation the tape, after leaving the wheel 31 and moving to the left, will accommodate its orientation to the space available in an entirely random manner.

Turning now to Figs. 2, 3, 5, 6 and 7 the tape 31 is constrained to move from top to bottom of the magazine (as viewed in Fig. 5), first being guided down an incline 61, around guide pins 62 and 63, between guide strip 64 and the wall 65 of the lower part 17 of the magazine, and thence about a portion of the circumference of the wheel 27, as previously explained.

Any tendency of the tape to wind itself about the wheel 27 is counteracted by a stripper blade 67 forming a part of the guide piece 64. Furthermore the lower end of this piece is caused to rest on the post 68 to prevent loops of the tape from becoming entangled in the region occupied by the pressure finger 69 now to be detailed.

Figure 3:
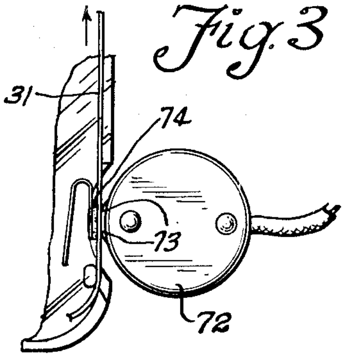
Fig. 3 is a detail in top plan of the reproducing head in its relation to the tape.

A magnetic recording head 72, having pole pieces 73—73, is so positioned that the tape 31 may be pressed thereagainst by the tension of a resilient finger 69 (Fig. 3). A felt or equivalent pad 74 may be secured to the bent-over end of the finger to provide pressure with minimum friction. At its supported end the finger 69 is deformed as shown to fit into a slot in the post 68 and to bear against the pin 63, and in such manner as to maintain the finger in operative position, notwithstanding removal or opening of the cover 18. It will be understood that the upper and lower walls as well as the side wall 65 of the magazine are cut out as shown at 80 to permit the head 72 to cooperate with the tape 31.

Sometimes it is desirable to provide automatic means for interrupting movement of the tape upon completion of its message, and which means is actuated by the tape itself. In such case there may be provided a switch 81 (Fig. 2) which includes a pair of hairpin-like contact members 82—82 adapted to bear on the tape with light pressure, which latter in turn is backed up by a fixed pad 83 of felt or the like. By the use of a short patch of conductive material applied to the tape, e. g. aluminum paint, the circuit across the contacts 82—82 may be completed, and the motor relay de-energized, when the patch of conductive material bridges the contacts.

Support for the upper end of the guide piece 64 is afforded by an abutment 85 to which the former is secured, as by a pin 86. The pad 83 may be cemented to this same abutment. It will be noted that the upper end of the abutment is arranged so as to terminate as closely as possible to the periphery of the wheel 27 in order to defeat any tendency of a buckled portion of the tape in that vicinity from being seized by the wheel and fouled.

The location of the tape idler wheel 27 toward one corner of the magazine rather than approximately midway along one edge thereof has been found to present at least one outstanding advantage, in that the tape, as it leaves the wheel 27, is confronted with a relatively large area within which it may loop back and forth without being crowded to the extent that some of the loops may actually become folded, and therefore weakened and torn, or else caught between the wheel 27 and stripper 67. By contrast, and assuming a magazine of the same width, a wheel carried midway of a short side of the magazine, will be confronted with approximately one-half the space into which the tape may be delivered, and consequent greater possibility of crowding of the tape and interference with the natural lay thereof.

By reason of the details of construction heretofore set out gravity is not relied upon as a factor in effecting proper departure of the tape from the wheel 27, and accordingly the invention magazine may be operated in any position whatsoever.

While I have shown a particular embodiment of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

A magazine for storing a length of elongated, thin, endless, flat, magnetizable, recording medium and for use with reproducing apparatus including a power-driven medium-advancing wheel comprising a casing defining a substantially parallelepipedic compartment, a wheel carried within the compartment and over which the medium is passed, said wheel being adapted to be opposed to the power-driven wheel for joint traction of the tape, a strip adjoining one side wall of said structure and defining therewith for its major extent a passage just sufficient to receive said medium for guiding thereof, said strip terminating at one end tangentially to said wheel and at the other end short of that end wall of the structure remote from said wheel, said other end being inclined away from said passageway, an inclined seat protruding from the side wall of the structure and defining with said other end of said strip a throat for entry of the medium into said passage, and a post spaced away from said seat for guiding the medium through said throat and into the passage.

References Cited in the file of this patent

UNITED STATES PATENTS

| Number | Name | Date |
|---|---|---|
| 743,419 | Armat | Nov. 10, 1903 |
| 1,297,049 | Webster | Mar. 11, 1919 |
| 1,341,108 | Burnett | May 25, 1920 |
| 1,525,939 | Holmes | Feb. 10, 1925 |
| 1,833,987 | Lasowsky | Oct. 25, 1932 |
| 2,499,700 | Tinkham et al. | Mar. 7, 1950 |
| 2,542,506 | Gibson | Feb. 20, 1951 |
| 2,551,198 | Barrett | May 1, 1951 |